Dec. 20, 1932.    O. M. KREMBS    1,891,546

BRAZING ROD

Filed Sept. 24, 1928

INVENTOR.
Ottmar M. Krembs
BY John E. Titus
ATTORNEY

Patented Dec. 20, 1932

1,891,546

UNITED STATES PATENT OFFICE

OTTMAR M. KREMBS, OF GLENCOE, ILLINOIS

BRAZING ROD

Application filed September 24, 1928. Serial No. 307,883.

This invention relates to improvements in hard soldering or brazing rods or bars and the like, and consists essentially in the provision of a bar or rod for brazing comprising a mixture of particles of a metal or an alloy imbedded in a suitable flux material or compound, which is enclosed in a protective sheathing of thin sheet metal foil, paper or other suitable covering material.

Objects of my invention are to provide a rod in which the flux and working materials are combined in a solid, rigid form which is suitable for handling in use and for storing; to provide a thin sheathing which will melt quickly and will not involve the introduction of an undesirable amount of solid metal into the rod, and which nearly hermetically seals the core to prevent loss of the core material and to protect the same from moisture and other elements which might attack and cause a deterioration in the core material so that the rods may be stored indefinitely; to provide a brazing rod which may be economically manufactured in any desirable size or cross-sectional shape; to provide a rod in which the ends are effectually sealed in the shearing operation of cutting the rods to predetermined lengths; and to provide a rod having a sheathing which is adapted to expand or contract so that the rods may be baked or heat treated after they have been formed without distorting the rods or forcing out the core material; and to provide a rod which may be compressed after the forming operations.

Illustrative embodiments of my invention are shown in the accompanying drawing, in which,—

Figure 1:
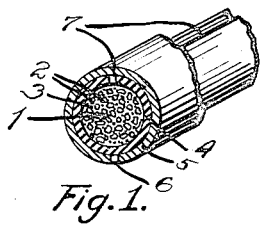
Fig. 1 is a perspective view of a fragment of a round brazing or hard soldering rod.

The core 1 consists of a mixture of solid particles 2 of the desired metals or alloys, which are imbedded in a pasty material 3 containing the flux.

In forming the rods, the core material is usually in a plastic state, and a tape or ribbon of suitable metallic foil or other easily fusible casing material is folded around a portion of the core material and forms the inner sheathing 4; then the outer sheathing 5 is folded closely around and superimposed on the inner sheath so as to cover the edges of the same. After the rods are formed they may be heated and compressed under pressure to solidify the core and fuse the pasty material around the solid particles. In the heating and compressing operations the excess moisture is driven out, the rods become very compact and rigid, and are reduced to a predetermined size. It is manifest that a rod having my plural form of sheathing is well adapted for being subjected to such finishing operations.

Figure 2:
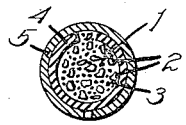
Fig. 2 and Fig. 3 are cross sections of slightly different forms of round rods.
Figure 3:
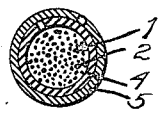

In Fig. 1 the core 1, consisting of the brazing material such as spelter, which consists essentially of compositions of zinc and copper in comminuted or granular form, mixed with a flux, such as powdered borax, is enclosed by the folded sheathings 4 and 5, which are formed of longitudinally folded tapes or ribbons of metallic foil of one half to one and one half or two thousandths of an inch in thickness, so that it will melt readily, or other suitable sheet material. The edges of the sheaths are folded nearly together with the opening between the edges 6 in the outer sheath 5 diametrically opposite to the edges 7 of the inner sheath 4. In this form the edges are pressed closely together, although the space in the inner sheath 4 may be comparatively wide, as in the form shown in Fig. 2, which is in other respects similar to the form shown in Fig. 1. In Fig. 3 is shown a modified form of the structure shown in Fig. 1 and Fig. 2, which may be more suitable in some instances, as where greater flexibility in the cross section is desired, in which the edges of the sheaths are offset, but on the same side of the rod.

Figure 4:
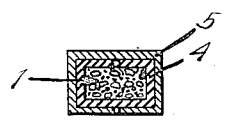
Fig. 4 and Fig. 5 are cross sections of different forms of square rods.
Figure 5:
Figure 6:
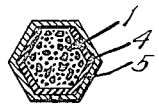
Fig. 6 is a cross section of a polygonal rod.

In Fig. 4 is shown a rectangular sectioned brazing rod comprising the spelter and flux mixture 1 enclosed by the superimposed sheathings 4 and 5. In this form the edges 6 and 7 are on opposite sides, while in the similar structure of Fig. 5 the edges are on adjacent sides of the rod.

For certain uses I provide a construction of my composite rod as described above, in which the inner sheath 4 is of one material, and the outer sheath 5 is of another. As for example one sheath, preferably the inner sheath 4, may be of zinc, which has a low melting point, and may be used as a component in the welding or brazing operation, and the outer sheath of very thin brass to provide a covering with higher heat resistance to prevent the rod from melting too fast, the zinc in the inner sheath and the zinc and copper in the brass and in the spelter being proportioned to combine and form the desired brazing alloy. In this manner the composition of the rod may be controlled to meet various conditions in brazing operations, by changing the materials or number of the sheathings or the grade and quantity of spelter in the core; and any of the compositions will melt readily with a low degree of heat such as used in brazing because the foil sheathings are so thin that they will melt in an open flame, and the spelter is in a finely divided state.

Figure 7:
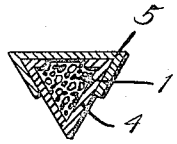
Fig. 7 is a cross section of a triangular rod.

The adaptability of my sheathing is further illustrated by the hexagonal shape which may be obtained as shown in Fig. 7, which shapes be particularly advantageous for certain uses.

It can now be perceived that the objects mentioned above, together with other objects which are now obvious, are accomplished by my invention. A stiff rod is provided and the core material is effectually held together and protected from the corrosive attacks of the air and moisture by the double sheathing. The sheath or casing can be easily formed in a single continuous folding operation. The core is well sealed since the edges of the inner sheath are covered, and the casing is sufficiently elastic to accommodate itself to the finishing operations because the outer sheath is free to slide over the inner sheath. The double sheathing renders the bar stiff and rigid, and does not easily open up in handling. Also less accuracy in the forming operations, where such accuracy is difficult to maintain, is required, since the final form can be easily and closely determined in the compressing and finishing operations.

Having thus described my invention, my claims are:—

1. A brazing rod consisting of a loose mass of flux and a thin strip of metal folded around to enclose the mass, the strip being folded longitudinally into a hollow rectangular section with the edges adjacently disposed at one side of the rod, and a second strip of metal folded tightly around the rod formed by the inner strip and said mass with the edges brought together on the opposite side of the rod so that the sheath formed by the outer strip prevents the inner sheath from spreading and opening up at the edges.

2. A brazing rod comprising a loose mass of flux, a thin strip of metal folded around the mass and enclosing the same, the strip being folded longitudinally into a rectangular section with sharply bent corners to provide longitudinal and transverse stiffness, the edges of the strip being folded down at one side of the rod, and a similar strip longitudinally folded tightly around the rod formed by the folding of the inner strip, the outer strip being folded so that the edges are disposed on the side of the rod opposite the edges of the inner sheath so that the inner sheath is thereby held together and prevented from spreading or opening up at the edges.

3. A brazing rod of rectangular cross section and comprising a core mixture of brazing metals and flux, an inner sheathing of thin metal foil in the form of a strip folded longitudinally to enclose the core mixture, and an outer sheathing similarly folded to enclose the inner sheath, the edges of one sheath being brought together in abutting relation at one side of the rod and the edges of the other sheath being brought together at the opposite side of the rod, the completed rod being compressed so that the sheaths are bent tightly together at the corners and the sides of the rod.

Signed at Chicago this 20th day of September, 1928.

OTTMAR M. KREMBS.